United States Patent Office 3,431,071
Patented Mar. 4, 1969

3,431,071
RECOVERY OF HYDROGEN FLUORIDE
Malcolm Patrick Simpson, Harwell, William Horton Hardwick, Upton, Peter Desmond Blundy, Leeds, and David Rowland Morris, London, England, assignors to United Kingdom Atomic Energy Authority, London, England
Continuation of application Ser. No. 149,104, Oct. 31, 1961. This application Apr. 27, 1965, Ser. No. 453,881
Claims priority, application Great Britain, Nov. 10, 1960, 38,724/60; Mar. 10, 1961, 8,881/61; May 1, 1961, 15,770/61
U.S. Cl. 23—153      8 Claims
Int. Cl. C01b 21/52; C07c 87/23

ABSTRACT OF THE DISCLOSURE

A process for recovering strong hydrogen fluoride from an aqueous solution thereof comprises contacting the solution with a solvent-free, water-insoluble liquid tertiary aliphatic amine of the class of amine having hydrofluorides which are water insoluble liquids and preferably of the class wherein each aliphatic group attached to the nitrogen atom is a primary fully saturated alkyl group of 6 to 10 carbon atoms having a chain of at least 6 carbon atoms terminating at the nitrogen atom; separating from the mixture an organic liquid phase which contains the amine and hydrogen fluoride, probably in the form of the amine hydrofluoride; and heating such separated phase to a temperature sufficient to decompose the amine hydrofluoride to recover hydrogen fluoride therefrom.

---

Figure 1:
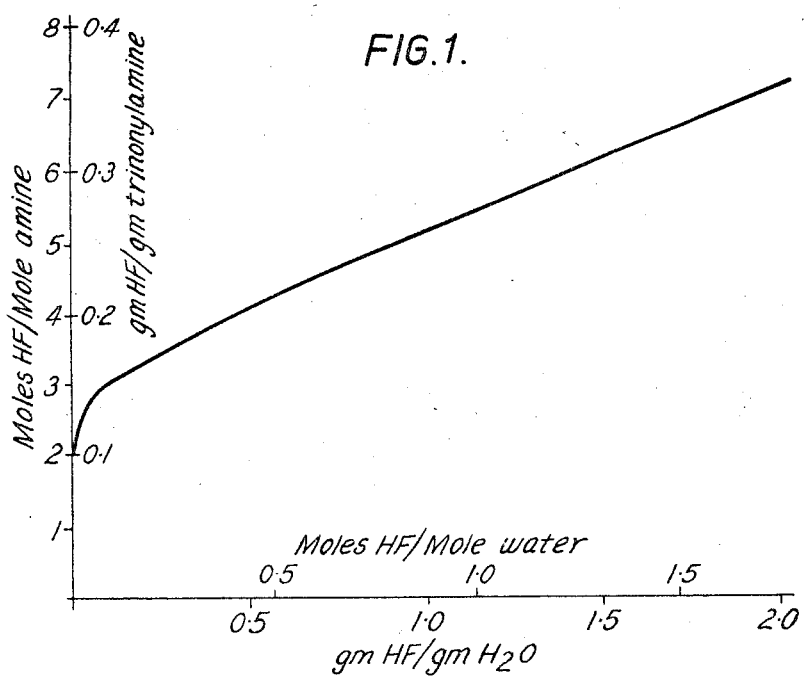

This application is a continuation of our copending application Ser. No. 149,104, filed Oct. 31, 1961, and now abandoned.

The present invention relates to the production of "strong hydrofluoric acid," which term should be understood to mean both anhydrous hydrogen fluoride and aqueous solutions of hydrogen fluoride containing less water than the azeotropic mixture. It will be known that hydrogen fluoride forms an azeotropic mixture with water containing approximately 38% by weight of hydrogen fluoride and the problem is therefore to produce aqueous hydrogen fluoride solutions containing less than this amount of water, for the anhydrous product can, if desired, readily be obtained from such strong solutions by distillation.

Anhydrous hydrogen fluoride is required for many purposes and in particular in the petroleum industry. One by-product of its use is dilute hydrofluoric acid and dilute hydrofluoric acid is also produced in other reactions, for example in the acid treatment of phosphate rock. It is desirable to remove or recover this dilute hydrofluoric acid either to improve the efficiency of the process or to obviate an effluent problem where neutralisation with lime or similar procedures are not practicable. The term "dilute hydrofluoric acid" clearly is used to define mixtures of hydrogen fluoride with water wherein the hydrogen fluoride proportion is less than or equal to that in the azeotrope.

The object of the invention is therefore the recovery of hydrogen fluoride from mixtures of hydrogen fluoride and water wherein the proportion of hydrogen fluoride is not greater than the azeotrope.

According to the invention there is provided a method of recovering strong hydrogen fluoride from a mixture of hydrogen fluoride and water, comprising the steps of contacting the mixture with a liquid consisting essentially of a water-insoluble tertiary amine having a hydrofluoride which is also liquid and water-insoluble, separating an organic liquid phase which comprises the said amine and dissolved hydrogen fluoride, and heating such organic liquid phase to a temperature sufficient to decompose the amine hydrofluoride thereby to recover hydrogen fluoride.

It will normally be found that some water is present in the organic liquid phase, for example between 1.0 and 1.2 moles per mole of amine, and consequently the hydrogen fluoride that is recovered will contain a proportion of water but much less than is present in the azeotrope. However this water is loosely bound in the complex hydrofluoride and if substantially anhydrous hydrogen fluoride is required, it is convenient to subject the liquid phase to a preliminary drying operation by heating the same to a temperature sufficient to drive off the major proportion of the water but insufficient substantially to decompose the hydrofluoride. It will be apparent that the actual temperature employed will depend on pressure.

It should also be pointed out that the amine is a liquid at the temperatures and pressures at which the operation is carried out and that the use of an amine which is solid at such temperatures and which therefore requires melting or the use of a solvent for the amine is not within the scope of this invention.

Examples of suitable amines are the tertiary aliphatic amines, in which each aliphatic group attached to the nitrogen atom is a primary alkyl group containing from 6 to 10 carbon atoms and having a chain of at least 6 carbon atoms terminating at the nitrogen atom.

Examples of these amines are tri-n-hexylamine, tri-(2,4-dimethyl hexyl) amine, tri-(2-ethylhexyl) amine, tri-(3,5,5-trimethyl hexyl) amine, tri-n-octylamine, tri-n-decylamine. Commercially available amines which are suitable are tri-iso-octylamine which is mainly tri-(2,4-dimethylhexyl) amine, tri-nonylamine which is mainly tri-(3,5,5-trimethyl hexyl) amine, tri-caprylamine which is a mixture of tri-n-octylamine and tri-n-decylamine, and tri-iso-decylamine which is a mixture of branched chain isomers. Of these amines the one presently preferred is tri-nonylamine which has a molecular weight of 395 and boils (760 mm. Hg) at 345-360° C.

This amine appears to be stable at elevated temperatures in the absence of oxygen and may be heated to a temperature at or just below its boiling point to remove the hydrogen fluoride content. If the extraction is carried out in the vapour phase, it will normally not be necessary to remove the water in a separate step, but if the extraction is carried out in the liquid phase, a temperature in the range 100° C. to 200° C. (760 mm. Hg) can be used to remove the water. However it should be made clear that the precise temperature used will depend on the pressure, the feed rate ratios and the maximum permissible concentration of water in the hydrogen fluoride stream. It should be noted that it may be convenient to arrange for a relatively high concentration of hydrogen fluoride in the water stream from the drier in order to minimise corrosion and hasten water removal.

It should be mentioned that the hydrofluorides of such amines may not be definite compounds and that there are indications that hydrogen fluoride is soluble both in the amine and in the solution of the amine hydrofluoride in the amine.

Figure 2:
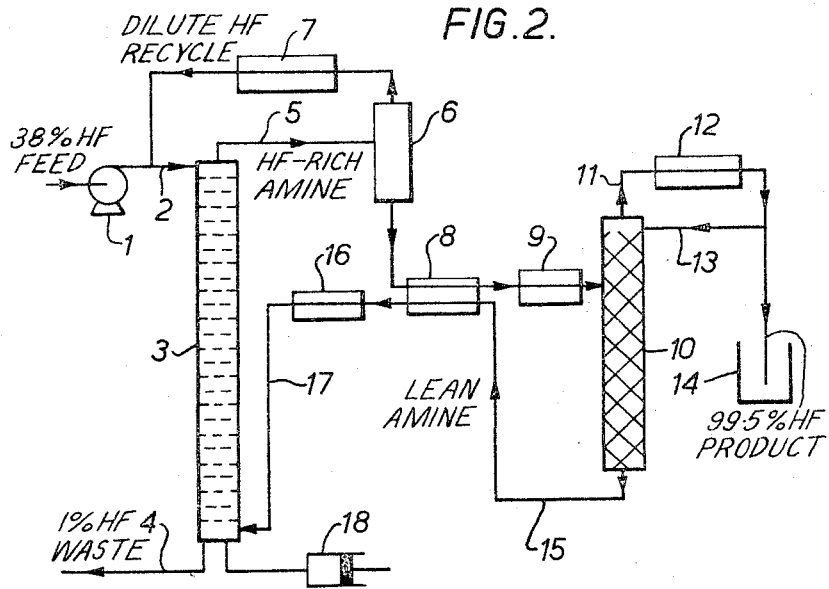
Figure 3:
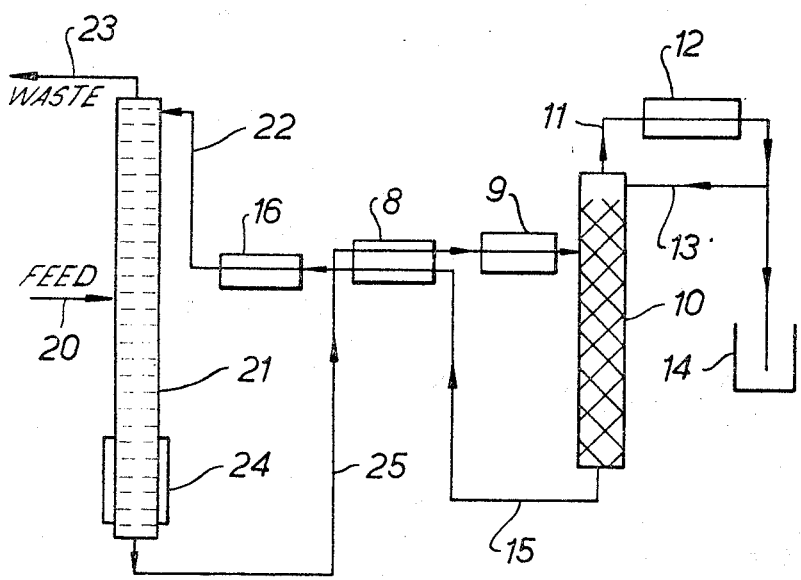

In order that the invention may more readily be understood, one embodiment of the same will now be described with reference to the accompanying drawings, wherein:

FIG. 1 is an equilibrium distribution diagram for the system amine-water-hydrogen fluoride, FIG. 2 is a flow-sheet diagram of the process of the invention, and FIG. 3 is a flow-sheet diagram of a modification of the process.

Referring now to the drawings and in particular to FIG. 1, it will be seen that the distribution of hydrogen fluoride between water (abscissa) and amine (ordinate)

is such that the hydrogen fluoride is reliably extracted from the water phase even in low concentrations. The scales are plotted in molar percentages and, in the case of the ordinate, also in weight percentages for the particular case where the amine is nonylamine.

In the embodiment of the invention shown in FIGURE 2 the extraction is carried out in the liquid phase and the feed solution is the azeotrope although it might equally well be more dilute hydrogen fluoride. In liquid phase extraction, it is normally more practical to recover anhydrous hydrogen fluoride from strong hydrofluoric acid and to apply this invention to the azeotropic residue, but this does not normally apply to vapour phase extraction.

The feed solution or aqueous phase is continuously passed by a pump 1 through a pipe 2 to the head of a packed extraction column 3, e.g., a sieve-plate column, operating at 60–70° C. to flow downwardly therethrough and emerge at the base of the column substantially free from dissolved hydrogen fluoride to flow through a pipe 4 to waste. The amine or organic phase is supplied by a pipe 17 to the base of the column 3 and in this embodiment the amine is commercial trinonylamine although, as explained above, various other amines are practicable. Also connected to the base of the extraction column 3 is a pulse pump 18 to obtain proper mixing on the column.

The outflow taken from the head of the extraction column 3 by a pipe 5 comprises amine containing substantially all the hydrogen fluoride dissolved therein together with a minor proportion of water and this outflow is fed to a flash evaporator 6 or any other type of evaporator which may be suitable to drive off the water content from the amine. The temperature at which this evaporator 6 works will quite clearly depend upon the pressure, as explained above, but the aqueous outflow therefrom will contain a proportion of hydrogen fluoride and consequently this water stream, after condensation in a condenser 7, is added to the aqueous phase fed to the column 3.

The organic phase from the evaporator is passed through a heat exchanger 8 and through a heater 9, and is then passed to an intermediate point of a distillation column 10 where distillation of the hydrogen fluoride content of the amine takes place. In general the temperature at the bottom of the distillation column will be in excess of the temperature in the evaporator but this is only so when the pressure in the distillation column is not less than the pressure in the evaporator. The outflow from the head of the distillation column is substantially anhydrous hydrogen fluoride and is taken by a pipe 11 to a condenser 12. A proportion of the condensed hydrogen fluoride is recycled to the distillation column via a pipe 13 and the remainder forms the product of the process, being collected in a product tank 14.

The outflow from the base of the distillation column is substantially hydrogen fluoride-free amine and this is passed via a pipe 15 to the said heat exchanger 8 and thence via a cooler 16 and the pipe 17 to form the feed to the base of the extraction column.

The apparatus may be constructed of copper or copper and mild steel except for the evaporator 6, condenser 7 and the connection carrying the water from the evaporator 6 to the extraction column 3. This part of the apparatus is most liable to corrosion and should be made of a resistant material, for example graphite or a nickel alloy.

As will be quite clear, the temperature in the various parts of the apparatus will depend on such factors as pressure, nature of the amine, feed rates etc. In one experiment, the feed solution was the azeotrope and the amine was commercial tri-nonylamine with feed rates of amine and azeotrope to the extraction column 3 of 3.8:1. Under these circumstances, the organic phase leaving this column contained approximately 2 mols hydrogen fluoride per mol of amine. The organic phase was then fed, after being heated to 70° C., to a flash evaporator operating at 330 mm. Hg and left it at a temperature of 180° C. containing approximately 0.2% water.

The distillation column 10 operated at 300 mm. Hg and the amine left it, substantially free of hydrogen fluoride, after boiling at a temperature of approximately 320° C. The product hydrogen fluoride was approximately 98% pure.

In the event that it is decided to operate a vapour phase extraction system, the apparatus of FIG. 3 is useful. It will be seen that this apparatus differs only slightly from that of FIGURE 2 and, where practicable, the parts carry the same references. The feed, which is vapour and which may contain any proportion of hydrogen fluoride, is fed via a pipe 20 to the centre of a packed column 21 to the top of which is fed lean amine by a pipe 22 from the cooler 16, the temperature of the amine feed being slightly above the boiling point of water at the pressure in the column 21. The outflow taken from the head of the column 21 by a pipe 23 is therefore steam and is condensed and led to waste. The lower section of the column 21 includes a boiler or heater 24 and the outflow from the base of the column is hot organic phase containing hydrogen fluoride but substantially no water; it is taken by a pipe 25 to the heat exchanger 8.

We claim:

1. A process for recovering strong hydrogen fluoride from a mixture of hydrogen fluoride and water wherein the proportion of hydrogen fluoride is not greater than the azeotrope, which process comprises contacting said mixture with a solvent free liquid agent consisting essentially of a water-insoluble liquid tertiary aliphatic amine, said amine being selected from the class of amines having at least one $C_6$–$C_{10}$ primary, fully saturated alkyl group having a chain of at least 6 carbon atoms terminating at the nitrogen atom of said amine, and having hydrofluorides which are water-insoluble liquids, separating an organic liquid phase containing the amine, hydrogen fluoride and amine hydrofluoride, heating the separated organic liquid phase to a temperature sufficient to decompose the amine hydrofluoride and recovering hydrogen fluoride therefrom.

2. A process for recovering strong hydrogen fluoride from a mixture of hydrogen fluoride and water wherein the proportion of hydrogen fluoride is not greater than the azeotrope, which process comprises contacting said mixture with a solvent-free liquid agent consisting essentially of an amine selected from the group consisting of tertiary aliphatic amines in which each aliphatic group attached to the amino-nitrogen atom is a primary fully saturated alkyl group of 6 to 10 carbon atoms having a chain of at least 6 carbon atoms terminating at said nitrogen atom, separating an organic liquid phase containing the amine, hydrogen fluoride and amine hydrofluoride, heating the separated organic liquid phase to a temperature sufficient to decompose the amine hydrofluoride and recovering hydrogen fluoride therefrom.

3. A process for recovering strong hydrogen fluoride from a mixture of hydrogen fluoride and water wherein the proportion of hydrogen fluoride is not greater than the azeotrope, which process comprises contacting said mixture with a solvent-free agent consisting essentially of a water-insoluble liquid tertiary aliphatic amine, said amine being selected from the class of amines having at least one $C_6$–$C_{10}$ primary, fully saturated alkyl group having a chain of at least 6 carbon atoms terminating at the nitrogen atom of said amine, and having hydrofluorides which are water insoluble liquids, separating an organic liquid phase containing the amine, hydrogen fluoride and amine hydrofluoride, heating the separated organic liquid phase to a temperature sufficient to drive off any water present therein but insufficient to decompose the amine hydrofluoride, thereafter further heating the separated organic liquid phase to a temperature sufficient to decompose the amine hydrofluoride and recovering hydrogen fluoride therefrom.

4. A process for recovering strong hydrogen fluoride from a mixture of hydrogen fluoride and water wherein the proportion of hydrogen fluoride is not greater than the azeotrope, which process comprises contacting said mixture with a solvent-free liquid agent consisting essentially of an amine selected from the group consisting of tertiary aliphatic amines in which each aliphatic group attached to the amino-nitrogen atom is a primary fully saturated alkyl group of 6 to 10 carbon atoms having a chain of at least 6 carbon atoms terminating at said nitrogen atom, separating an organic liquid phase containing the amine, hydrogen fluoride and amine hydrofluoride, heating the separated organic liquid phase to a temperature sufficient to drive off any water present therein but insufficient to decompose the amine hydrofluoride, thereafter further heating the separated organic liquid phase to a temperature sufficient to decompose the amine hydrofluoride and recovering hydrogen fluoride therefrom.

5. A process for recovering strong hydrogen fluoride from a mixture of hydrogen fluoride and water wherein the proportion of hydrogen fluoride is not greater than the azeotrope, which process comprises contacting said mixture with a solvent-free liquid agent consisting essentially of tri(3,5,5-trimethyl hexyl) amine, separting an organic liquid phase containing the amine, hydrogen fluoride and tri(3,5,5-trimethyl hexyl) amine hydrofluoride, heating the separated organic liquid phase to a temperature sufficient to drive off any water present therein but insufficient to decompose the amine hydrofluoride, thereafter further heating the separated organic liquid phase to a temperature sufficient to decompose the amine hydrofluoride and recovering hydrogen fluoride therefrom.

6. A process for recovering strong hydrogen fluoride from a mixture of hydrogen fluoride and water wherein the proportion of hydrogen fluoride is not greater than the azeotrope, which process comprises contacting said mixture with a solvent-free liquid agent consisting essentially of an amine selected from the group consisting of tertiary aliphatic amines in which each aliphatic group attached to the amino-nitrogen atom is a primary fully saturated alkyl group of 6 to 10 carbon atoms having a chain of at least 6 carbon atoms terminating at said nitrogen atom, separating an organic liquid phase containing the amine, hydrogen fluoride and amine hydrofluoride, heating the separated organic liquid phase to a temperature sufficient to drive off any water present therein but insufficient to decompose the amine hydrofluoride, adding such water to the mixture of the hydrogen fluoride and water to form fresh feed solution, thereafter further heating the separated organic liquid phase to a temperature sufficient to decompose the amine hydrofluoride and recovering hydrogen fluoride therefrom.

7. A process for recovering strong hydrogen fluoride from a mixture of hydrogen fluoride and water wherein the proportion of hydrogen fluoride is not greater than the azeotrope, which process comprises contacting said mixture with a solvent-free liquid agent consisting essentially of an amine selected from the group consisting of tertiary aliphatic amines in which each aliphatic group attached to the amino-nitrogen atom is a primary fully saturated alkyl group of 6 to 10 carbon atoms having a chain of at least 6 carbon atoms terminating at said nitrogen atom, separating an organic liquid phase containing the amine, hydrogen fluoride and amine hydrofluoride, heating the separated organic liquid phase to a temperature in the range 100° C. to 200° C. to drive off any water present therein, thereafter further heating the separated organic liquid phase to a temperature sufficient to decompose the amine hydrofluoride and recovering hydrogen fluoride therefrom.

8. A process for recovering strong hydrogen fluoride from a mixture of hydrogen fluoride and water wherein the proportion of hydrogen fluoride is not greater than the azeotrope, which process comprises contacting said mixture with a solvent-free liquid agent consisting essentially of an amine selected from the group consisting of tertiary aliphatic amines in which each aliphatic group attached to the amino-nitrogen atom is a primary fully saturated alkyl group of 6 to 10 carbon atoms having a chain of at least 6 carbon atoms terminating at said nitrogen atom, separating an organic liquid phase containing the amine, hydrogen fluoride and amine hydrofluoride, heating the separated organic liquid to a temperature sufficient to drive off any water present therein but insufficient to decompose the amine hydrofluoride, thereafter further heating the separated organic liquid phase to a temperature sufficient to decompose the amine hydrofluoride but not in excess of the boiling point of the amine, and recovering hydrogen fluoride therefrom.

References Cited

UNITED STATES PATENTS

| 2,388,156 | 10/1945 | Kelley | 23—153 X |
| 2,400,874 | 5/1946 | Burk | 23—153 |
| 2,400,875 | 5/1946 | Hughes et al. | 23—153 |

EARL C. THOMAS, *Primary Examiner.*

E. STERN, *Assistant Examiner.*

U.S. Cl. X.R.

260—583